March 23, 1954  R. T. CORNELIUS  2,673,062
CHECK VALVE
Filed July 16, 1951

Inventor
RICHARD T. CORNELIUS
By Caswell & Lagaard
ATTORNEYS

Patented Mar. 23, 1954

2,673,062

UNITED STATES PATENT OFFICE 2,673,062

CHECK VALVE

Richard T. Cornelius, Minneapolis, Minn.

Application July 16, 1951, Serial No. 236,985

6 Claims. (Cl. 251—144)

The herein disclosed invention relates to check valves and has for an object to provide a check valve capable of being used for high pressures.

Another object of the invention resides in providing a check valve which will operate on small variations of pressure.

A still further object of the invention resides in providing a check valve in which the valve head seats positively on the valve seat and forms a fluid tight seal therewith.

An object of the invention resides in providing a check valve in which the parts forming the fluid passages are stream-lined to reduce the resistance to the flow of the fluid through the valve.

Another object of the invention resides in providing a check valve utilizing a flexible valve member which cannot be extruded upon the existence of high pressures in the valve.

A still further object of the invention resides in providing a valve seat constructed of metal and having a conical face formed with an annular recess therein and in disposing in said recess a flexible seal having a feathering edge adapted to engage the valve head in advance of engagement of the valve head with the metallic portion of the valve seat.

An object of the invention resides in providing an annular groove in back of said seal in which the fluid may enter and by means of which pressure is exerted on the valve head and annulus to cause a positive seal between the valve head and seat.

Another object of the invention resides in constructing the valve head with oppositely facing conical portions and in providing an actuator therefor having a conical bore spaced from one of the conical portions of the valve head to form an annular passageway decreasing in diameter in a direction away from the valve seat.

An object of the invention resides in providing a cross consisting of two intersecting blades attached to said valve head and actuator and holding the same in spaced relation.

Other objects of the invention reside in the novel combination and arrangement of parts and in the details of construction hereinafter illustrated and/or described.

Figure 1:
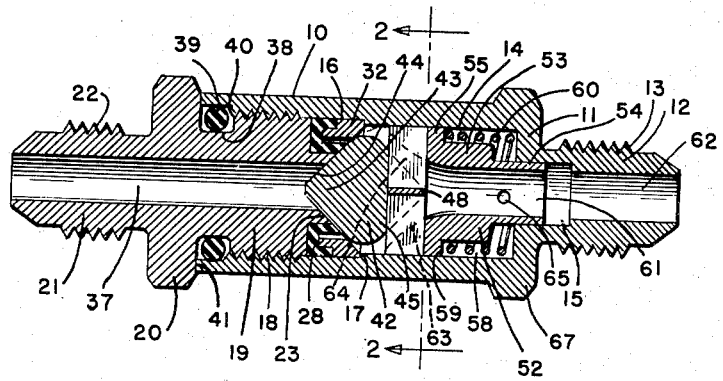
Fig. 1 is a longitudinal sectional view of a check valve illustrating an embodiment of the invention and taken on line 1—1 of Fig. 2.

In the drawings has been shown a valve body having an inlet and an outlet and a plug mounted within said body intermediate the inlet and outlet. This plug has a conical valve seat on which a valve head rests. The valve head consists of a leading conical portion and a trailing conical portion arranged base to base, the leading conical portion being adapted to seat against the valve seat. Said valve seat is constructed with an annular recess in which a seal constructed of resilient material such as rubber or the like is disposed. This seal has an annulus which is beveled to conform to the conical surface of said seat and at the outermost portion thereof is formed with a feathering edge which projects outwardly beyond the surface of the valve seat and engages the valve head in advance of engagement of the valve head with the seat proper. An annular groove is formed outwardly of the outer surface of the annulus in which the fluid may enter whereby the pressure on the annulus forces the same, including the feathering edge of the annulus against the valve head and effects a positive seal between said valve head and valve seat. Attached to the trailing conical portion of the valve head is an actuator which has a conical bore, the surface of which is spaced from the surface of the trailing conical portion of said valve head to form therewith an annular passageway gradually decreasing in diameter in a direction away from said valve head. A cross consisting of two intersecting blades is mounted in grooves formed in the actuator and head and attaches the actuator to the head and maintains the spacing of said head and actuator. Resilient means acting against the valve body and actuator urges the valve head against the valve seat.

The invention comprises a body 10 which is tubular in form and which is open at one end and constructed at its other end with an end wall 11. On the body 10 is formed a wrench head 67. The end wall 11 is formed with a boss 12 extending outwardly therefrom and which is constructed with threads 13 on which a suitable tube connector may be screwed. The body 10 has a bore 14 which extends up to the end wall 11 and is formed with another bore 15 of small diameter which extends through said end wall and through the boss 12. Towards the open end of the body 10 the same is formed with an enlargement 16 of the bore 14 which provides a shoulder 17 therebetween. Near the open end of said body are formed internal threads 18 and into which a threaded plug 19 is screwed. The plug 19 is constructed with a wrench head 20 and terminates at its outer end in a boss 21 similar to the boss 12. This boss is formed with threads 22 and to which a suitable tube connector may be screwed.

Figures 2, 4:
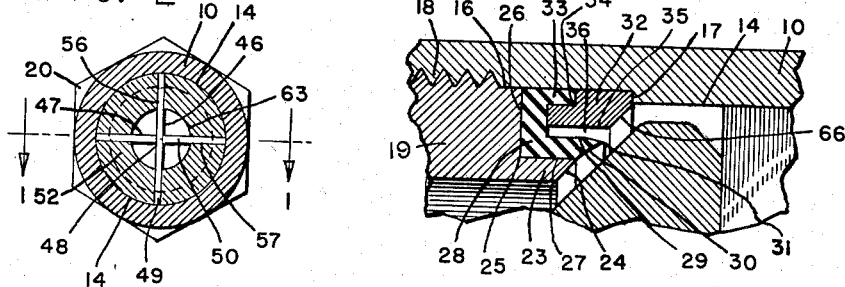
Fig. 2 is a cross sectional view taken on line 2—2 of Fig. 1.
Fig. 4 is an enlarged fragmentary sectional view similar to Fig. 1 of a portion of the structure shown therein and illustrating the valve in open position.
Figure 3:
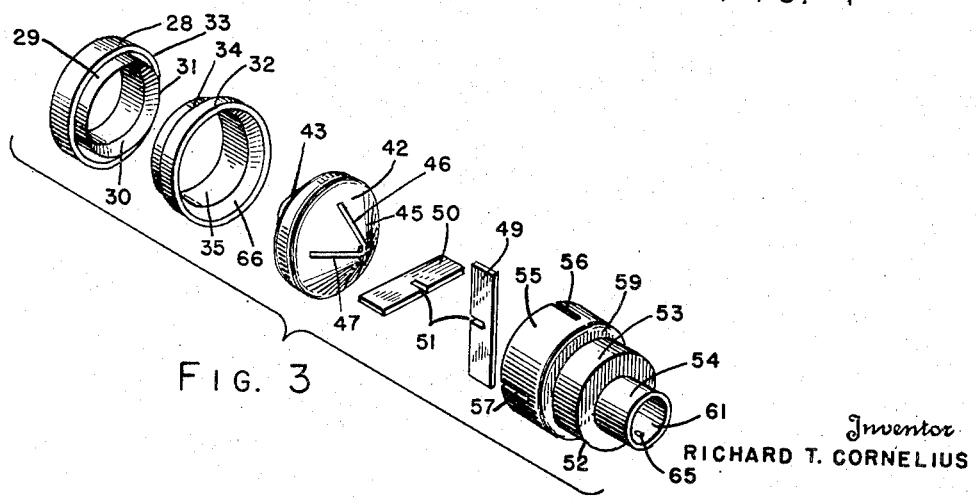
Fig. 3 is an exploded perspective view of certain of the parts of the valve separated from one another.

Within the interior of the valve is provided a valve seat 23 which is formed on the plug 19. This valve seat is best shown in Fig. 4. For the purpose the inner end of the said plug is constructed with a neck 70 which is provided with a conical surface 24 and with an annular recess 25 at the innermost end thereof and adjoining the surface 24. This recess forms in the plug 19 a radial surface or shoulder 26 and a cylindrical surface 27. In this recess is disposed a flexible seal 28 which has an annulus 71 and which fits snugly against the surfaces 26 and 27 of the plug 19. A flange 72 on this seal extends outwardly therefrom and engages the shoulder 26. The seal 28 has an outer cylindrical surface 29 and a substantially conical surface 30 which lies substantially in continuation of the surface 24 of the plug 19. The extreme end of the annulus of seal 28 is formed with a feathering edge 31 which projects slightly outwardly beyond the surface 24 of the plug 19. The seal 28 is held in position in the recess 25 by means of a ring 32 which is seated against the shoulder 17 formed in body 10. The seal 28 has an annular skirt 33 which engages the enlargement 16 of bore 15 and fits into an annular recess 34 in the ring 32. When the plug 19 is screwed up tight the ring 32 is received with the enlargement 16 of bore 14 and butts up against the shoulder 17. In such position the plug 19 clamps the seal 28 against said ring and the seal is held in proper position. The ring 32 is formed with an inner cylindrical surface 35 concentric with the surface 29 of the seal 28 and which is spaced therefrom to provide an annular space or groove 36 therebetween. The ring 32 is further constructed with a conical surface 66 which lies in continuation of the surface 24 of the valve seat 23. The valve seat 23 encircles a passageway 37 extending through the plug 19 and the boss 21 and which forms an inlet passageway or chamber for the valve.

To provide a seal between the plug 19 and the body 10, the plug 19 is formed with an annular groove 38 in which is disposed an O-ring 39 constructed of flexible material. The body 10 at the extreme ends of the same is formed with an undercut 40 forming a surface against which the ring 39 seals. The extreme end 41 of the body 10 butts up against the wrench head 20 and limits movement of the plug toward the shoulder 17. The pressure on the seal 28 is thus predetermined. The ring 39 prevents leakage of the fluid out of the valve.

Cooperating with the valve seat 23 is valve head 42 which has a leading portion 43 formed with a conical surface 44. This surface is adapted to engage the seat 23 and when seated against the same closes the valve. The said valve head further has a trailing conical portion 45 which extends in the opposite direction from the portion 43. In this portion is formed two transverse slots 46 and 47 in which is received a cross 48 consisting of two blades 49 and 50. These blades have corresponding grooves 51 formed in the same of a width equal to the thickness of said blades and of a depth equal to one-half the width of the blades so that the said blades may be assembled to form a cross and may be inserted into the grooves 46 and 47 as shown in Fig. 2. The blades 49 and 50 are of a length equal to the diameter of the bore 14 and slide along the said bore forming a guide for guiding the valve head 42 for movement toward and from the valve seat 23.

Operating in conjunction with the valve head 42 is an actuator 52. This actuator is in the form of a figure of revolution and includes a cylindrical body portion 53 with a tubular portion 54 extending outwardly therefrom at one end of said actuator. This portion slides within the bore 15 in the body 10 and assists in guiding the actuator for axial movement along said bore. The said actuator further includes a flange 55 which engages the bore 14 and further guides the said actuator for longitudinal movement within the body 10. The flange 55 has slots 56 and 57 formed in the same, similar to the slots 46 and 47, and which receive the blades 49 and 50 of the cross 48. The blades 49 and 50 are pressed into the slots 46 and 47 as well as into the slots 56 and 57 and thereby hold the valve head 42 attached to the actuator 52. It will be readily comprehended that the valve head 42 and actuator 52 move as a unit within the bore 15. The body 53 of the actuator 52 has an external diameter less than that of the bore 14 so that an annular space 58 is formed therebetween and so that a shoulder 59 is formed at the end of the flange 55. In this space is disposed a compression coil spring 60 which is seated against said shoulder and also against the inner surface of the end wall 11 of body 10. This spring urges the surface 44 of valve head 42 against the valve seat 23 to close the valve.

The body portion 53 of actuator 52 is formed with a central passageway 61 which communicates with a passageway 62 in the boss 12. The inner end of the flange 55 of actuator 52 is constructed with a flare 63 which forms in conjunction with the trailing conical portion 45 of the valve head 42 an annular passageway 64 communicating with the bore 14 of body 10 adjacent the ring 32. This portion of the bore 14, the passageway 64 and the passageway 61 form the outlet chamber or passageway of the valve.

To allow the fluid disposed within the space 58 to expand and contract a vent 65 is formed in the tubular portion 54 of actuator 52 which communicates with the passageway 61. This vent allows the air in the said space 58 to move freely back and forth into the passageway 61 and equalizes the pressure on both sides of actuator 52 so that the same may travel freely in the bore 14.

The operation of the invention is as follows: When the pressure in the passageway 37 exceeds that in passageway 61 the valve head 42 is moved away from the valve seat 23 against the action of the spring 60. The valve head then moves away from the seat 23. The feathering edge 31 of seal 28, in such case, extends outwardly beyond the surfaces 24 and 66 of the valve seat 23 and the ring 32. Upon the pressure in passageway 37 being lowered to below that of passageway 61 the pressure against the valve head 42 causes the same to move toward the seat 23. The feathering edge 31 of seal 28 thus first engages the surface 44 of valve head 42 and causes a positive seal between the chambers formed by the passageways 37 and 61. Thereafter the surface 44 engages the surface 24 of the valve seat 23 and movement of the valve head is arrested. Both the surfaces 24 and 44 are preferably ground so that the said surfaces further obstruct the flow of fluid from passageway 37 to the passageway 61 when the valve is closed. Due to the space 36 formed between the ring 32 and the seal 28 the back of the seal is subject to the pressure within the passageway 61. This has the effect of forcing the said seal into the recess 25 and against the surfaces 26 and 27 of the plug 19. At the same time the feathering edge 31 is in engagement with the surface 44 of valve head 42 and pressure against the cylindrical surface 29 of seal 28 forces the surface 30 of said seal into engagement with the surface 44 of the valve head 42. There, hence, is no place where the material of the seal can travel and a perfect seal is effected between the valve head and valve seat. If the pressure in chamber 61 is increased the pressure on the valve head 42 is also increased and the firmness of the seat between the surface 44 and the surface 24 is correspondingly increased. Hence, the increase in pressure on the seal 28 has no different effect on the disposition of the same with relation to the valve head and plug and the said seal remains without change. It will, hence, be readily comprehended that extremely great pressures may be exerted without causing extrusion of the seal or otherwise render the device inoperative.

The advantages of the invention are manifest. Due to the construction of the valve head with the two conical portions and the actuator with the flare, annular passageways are formed about the valve head which lead the fluid past the valve head with a minimum amount of resistance. At the same time high pressures may be used in the valve and the valve will return to normal position without affecting the seal or without hindering the operation of the valve. The return spring being disposed within the space formed between the bore of the body and the actuator is concealed and resistance to the passageway of the fluid past the spring is eliminated. By the use of the O-ring for effecting a seal between the plug and the body the plug may be screwed in exactly the right amount to properly compress the seal without requiring adjustment on the part of the user. The device is extremely simple in construction and is positive and foolproof in action.

Changes in the specific form of the invention, as herein described, may be made within the scope of what is claimed without departing from the spirit of the invention.

Having described the invention, what is claimed as new and desired to be protected by Letters Patent is:

1. In a check valve, a body having an inlet chamber and an outlet chamber with a valve seat intermediate the same, said valve seat having a substantially conical surface, said body being formed with a bore constituting a portion of said outlet chamber, a valve head having a substantially conical leading portion formed with a surface adapted to seat against said valve seat and a substantially conical trailing portion disposed within said bore, a tubular actuator slidable within said bore and supporting said valve head, said actuator being flared adjacent said trailing conical portion of the valve head to form an annular passageway therebetween, supporting means extending between said actuator and valve head and including members spaced from one another at portions thereof and engaging both said valve head and actuator and resilient means for urging said actuator toward said valve seat.

2. In a check valve, a body having an inlet chamber and an outlet chamber with a valve seat intermediate the same, said valve seat having a substantially conical surface, said body being formed with a bore constituting a portion of said outlet chamber, a valve head having a substantially conical leading portion formed with a surface adapted to seat against said valve seat and a substantially trailing portion disposed within said bore, a tubular actuator slidable within said bore and supporting said valve head, said actuator being flared adjacent said trailing conical portion of the valve head to form an annular passageway therebetween, said actuator and valve head having aligning longitudinally extending slots therein, a blade disposed in said slots and holding said actuator spaced from said valve head and resilient means acting against said actuator and moving said actuator and valve head toward said valve seat.

3. In a check valve, a body having an inlet chamber and an outlet chamber with a valve seat intermediate the same, said valve seat having a substantially conical surface, said body being formed with a bore constituting a portion of said outlet chamber, a valve head having a substantially conical leading portion formed with a surface adapted to seat against said valve seat and a substantially conical trailing portion disposed within said bore, a tubular actuator slidable within said bore and supporting said valve head, said actuator being flared adjacent said trailing conical portion of the valve head to form an annular passageway therebetween, said valve head and actuator having intersecting longitudinally extending grooves therein, a cross consisting of intersecting blades received within said grooves and holding said actuator and valve head spaced from one another and resilient means for urging said actuator toward said valve seat.

4. In a check valve, a body having an inlet chamber and an outlet chamber with a valve seat intermediate the same, said valve seat having a substantially conical surface, said body being formed with a bore constituting a portion of said outlet chamber, a valve head having a substantially conical surface adapted to seat against the conical surface of said valve seat, a tubular actuator slidable in said bore and connected to said valve head and spaced therefrom to form a passageway therebetween, said actuator having a body portion of less diameter than the diameter of said bore to provide an annular space therebetween, a spring received within said space and acting against said body and actuator and urging said actuator and valve head toward said valve seat and connecting means between said actuator and valve head and conducting fluid flowing through said actuator about said valve head.

5. In a valve, a body having a bore therein open at its ends and formed with an enlargement at one end providing an annular shoulder intermediate the ends of the bore, a plug disposed in said enlargement and having a passageway therethrough, a neck formed on said plug and having an annular substantially conical valve seat encircling said passageway, said plug having a shoulder extending outwardly from said neck and toward said bore, a ring disposed within said enlargement and seated at one end against the shoulder in said bore and spaced at its other end from the shoulder on said plug, a recess in the outer portion of said ring facing the shoulder on said plug, a flexible seal having an annulus encircling said neck and provided with a substantially conical surface lying substantially in continuation of the conical surface of said neck, a flange issuing outwardly from said annulus and lying in the space between the shoulder on said plug and the juxtaposed end of the ring, a skirt on said flange disposed in the recess in said ring, and a valve head engageable with said seal and valve seat.

6. In a valve, a body having a bore therein open at its ends, a ring disposed within the bore of said body and having an outwardly facing recess therein, a plug in one end of said body having a passageway therethrough and a neck formed at its end with a valve seat having a substantially conical surface encircling said passageway, a flexible seal disposed within said bore and formed with an annulus encircling said neck and having a substantially conical surface lying substantially in continuation of the surface of the valve seat, a skirt on said seal extending in the same direction as said annulus and spaced therefrom, said skirt being received within said recess and a valve head engageable with said seal and valve seat.

RICHARD T. CORNELIUS.

References Cited in the file of this patent
UNITED STATES PATENTS

| Number | Name | Date |
| --- | --- | --- |
| 1,518,233 | Trager | Dec. 9, 1924 |
| 1,948,628 | Penick | Feb. 27, 1934 |
| 1,971,713 | Greve | Aug. 28, 1934 |
| 2,060,748 | Roberts | Nov. 10, 1936 |
| 2,151,442 | Roberts | Mar. 21, 1939 |
| 2,182,278 | Brauer | Dec. 5, 1939 |
| 2,192,425 | Allen | Mar. 5, 1940 |
| 2,481,713 | Bertea | Sept. 13, 1949 |
| 2,524,951 | Ashton | Oct. 10, 1950 |
| 2,538,364 | James | Jan. 16, 1951 |